United States Patent [19]  [11] 3,875,158
Schlunke et al.  [45] Apr. 1, 1975

[54] OXY SUBSTITUTED 2,3 OXY METHYL QUINOXALINES

[75] Inventors: Hans-Peter Schlunke, Marly; Christian Egli, Magden, both of Switzerland

[73] Assignee: Ciba-Geigy AG, Basel, Switzerland

[22] Filed: Mar. 26, 1973

[21] Appl. No.: 344,815

Related U.S. Application Data

[63] Continuation-in-part of Ser. No. 176,749, Aug. 31, 1971, Pat. No. 3,796,576.

[30] Foreign Application Priority Data

Sept. 4, 1970    Switzerland.................. 13253/70

[52] U.S. Cl. ........ 260/250 Q, 260/250 QP, 96/53, 96/20
[51] Int. Cl. ........................................ C07d 51/78
[58] Field of Search ................................ 260/250 Q

[56] References Cited
UNITED STATES PATENTS
3,095,413  6/1963  Sassle .................. 260/250 Q
3,772,273  11/1973  Gilbert .................. 260/250 Q
3,796,576  3/1974  Schlunke .................. 260/250 Q OTHER PUBLICATIONS
Moriconi et al., J. Org. Chem. 30, 1542–1547 (1965).
Krajewski et al., J. Agr. Food Chem., 1971, pp. 298–301.

Primary Examiner—Richard J. Gallagher
Assistant Examiner—David E. Wheeler
Attorney, Agent, or Firm—Joseph G. Kolodny; Edward McC. Roberts; Prabodh I. Almaula

[57] ABSTRACT

A photographic, light-sensitive material for the silver dye bleach process, which comprises on a carrier, in at least one layer as dye bleaching catalyst a quinoxaline of the formula

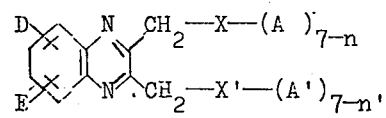

wherein D is oxygen, halogen,

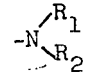

or $-O-R_3$, E hydrogen, nitro, $-O-R_4$ or $-COO-R_4$, $R_1$ and $R_2$ each representing hydrogen, acyl or lower alkyl and $R_3$ and $R_4$ each representing hydrogen or lower alkyl, or wherein D and E in vicinal position form together a residue of formula $-O-(CH_2)_m-O-$, wherein $m$ is 1 or 2, X and X' each represent one atom of an element of the fourth to seventh main group of the periodic system, A and A' each represent hydrogen or an organic residue, and $n$ and $n'$ each represent the group number of the atom X or X', so that in so for as $n$ or $n'$ is 4 or 5 the individual residues A or A' are the same or different as well as new quinoxalines of formula (1) wherein in case X is oxygen or halogen, one of D and E is different from hydrogen are disclosed.

7 Claims, No Drawings

OXY SUBSTITUTED 2,3 OXY METHYL QUINOXALINES

CROSS REFERENCE TO RELATED APPLICATION

This application is a continuation-in-part of application Ser. No. 176,749 filed Aug. 31, 1971, now U.S. Pat. No. 3,796,576.

The present invention relates to photographic material containing a quinoxaline as dye bleaching catalyst.

According to the present invention there is provided a photographic, light sensitive material for the silver dye-bleaching process which comprises on a carrier, in at least one layer as dye bleaching catalyst a quinoxaline of formula (1) 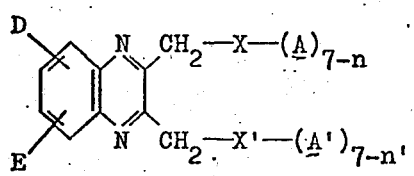

wherein D is hydrogen, halogen,

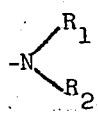

or $-O-R_3$, E hydrogen, nitro, $-O-R_4$ or $-COO-R_4$, $R_1$ and $R_2$ each representing hydrogen, acyl or lower alkyl and $R_3$ and $R_4$ each representing hydrogen or lower alkyl, or wherein D and E, in vicinal position, form together a residue of formula $-O-(CH_2)_m-O-$, wherein $m$ is 1 or 2, X and X' each represent one atom of an element of the fourth to seventh main group of the periodic system, A and A' each represent hydrogen or an organic residue and $n$ and $n'$ each represent the group number of the atom X or X' so that insofar as $n$ or $n'$ is 4 or 5, the individual residues A or A' are the same or different, as well as new quinoxalines of formula (1) wherein in case X is oxygen or halogen, either D or E is different from hydrogen.

With reference to the periodic system, the periodic system of elements after Mendelejeff is meant.

X and X' may be different but are preferably identical. Amongst the elements of the fourth to seventh main group, those of the second and fourth periods are preferred. X and X' may therefore be, for instance, carbon, silicon, nitrogen, phosphorus, oxygen, sulphur, selenium, chlorine or bromine.

In as far as A and A' represent an organic residue, these residues may also be combined in a ring, so that A and A' for instance form together an alkylene or alkylidene residue.

Quinolxalines of formula (2) 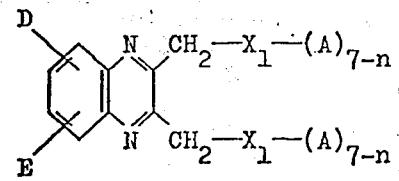

may be used, wherein $X_1$ represents carbon, nitrogen oxygen, sulphur or halogen and $n$ represents the group number of the atom $X_1$ and D, E and A have the specified meaning.

Of special interest for this purpose are quinoxalines of formula (3) 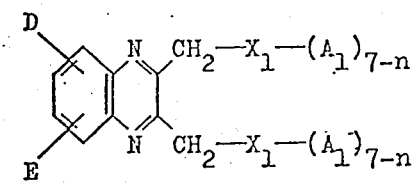

wherein $A_1$ represents hydrogen, carboxyl, nitrile, alkyl, substituted alkyl, acyl, alkoxy carbonyl, aryl, aralkyl, amidine, possibly in salt form, or a 5- or 6-membered heterocyclic residue with nitrogen, oxygen or sulphur as hetero atom, as wherein, if $n$ is 4 or 5, the individual residues $A_1$ are the same or different and wherein, if $n$ is 4, 5 or preferably 6, the two $A_1$ together form an alkylene or alkylidene residue and D, E, $X_1$ and $n$ have the specified meaning.

Satisfactory results are obtained with quinoxalines of formula (4) 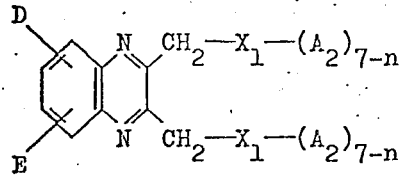

and especially of formula (5) 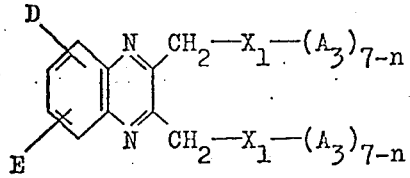

wherein $A_2$ is hydrogen, carboxyl, nitrile, lower alkyl, acyl or lower alkoxy carbonyl and $A_3$ is hydrogen, methyl, ethyl, acetyl or ethoxy carbonyl, wherein, if $n$ is 4 or 5, the individual residues $A_2$ and $A_3$ are the same or different and D, E, $X_1$ and $n$ have the specified meaning.

Particularly suitable quinoxalines correspond to formula (6) 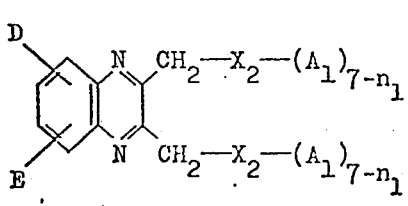

wherein $X_2$ is carbon, oxygen, sulphur or bromine and $n_1$ has the group number of atom $X_2$ and D, E and $A_1$ have the specified meaning.

Other suitable quinoxalines correspond to formula (7) 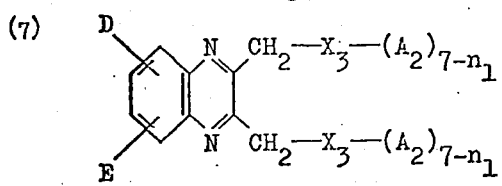

or especially formula (8) 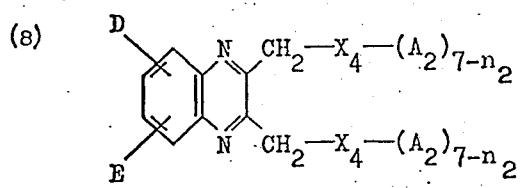

wherein $X_3$ is carbon, oxygen or bromine, $X_4$ carbon or oxygen and $n_2$ has the group number of atom $X_4$ and D, E, $A_2$ and $n_1$ have the specified meaning.

Amongst the quinoxalines of formulae (5) and (8), especially those with formula (9) 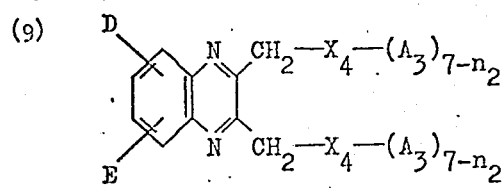

are outstanding, wherein D, E, $X_4$, $A_3$ and $n_2$ have the specified meaning.

Of special interest are quinoxalines of formula

(10) 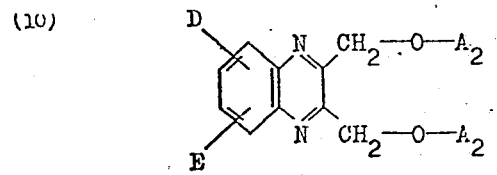

especially however formula

(11) 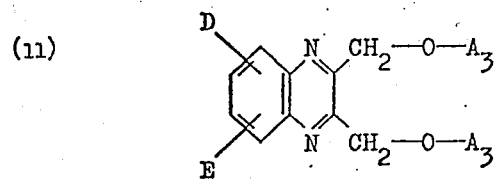

and in particular of formula

(12) 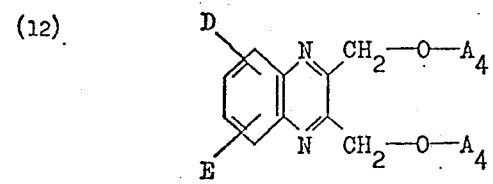

wherein $A_4$ is hydrogen, methyl or acetyl and $A_2$, $A_3$, D and E have the specified meaning.

Amongst the compounds of formula (12) those of formula

(13) 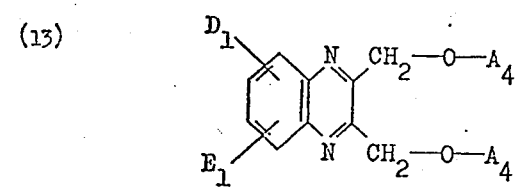

are again preferred, wherein $D_1$ is hydrogen, acetyl amino, methoxy or chlorine and $E_1$ oxygen, carboxyl, lower alkoxy or lower alkoxy carbonyl, or $D_1$ and $E_1$ are in adjoining position, forming together a residue of formula —O—$(CH_2)_m$—O—, wherein $m$ equals 1 or 2 and $A_4$ has the specified meaning.

Preferential use is made of quinoxaline of formula

(14) 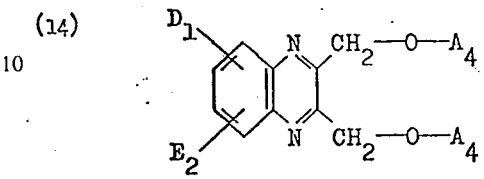

and especially of formula

(15) 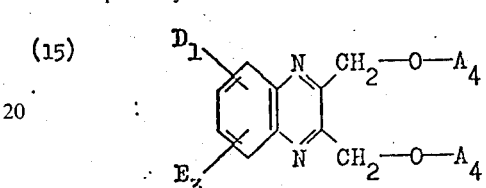

wherein $E_2$ is hydrogen, methoxy, carboxyl or ethoxy carbonyl and $E_3$ hydrogen, methoxy or carboxyl, and $A_4$ and $E_1$ have the specified meaning.

Quinoxalines with especially advantageous properties for the use according to the invention correspond to formula

(16) 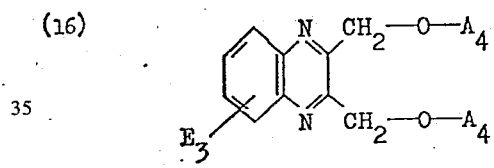

especially formula

(17) 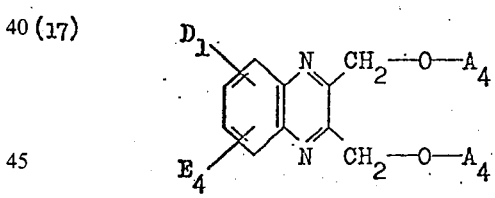

preferably formula

(18) 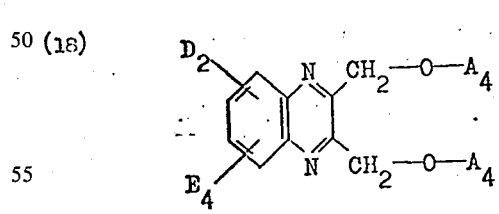

especially formula

(19) 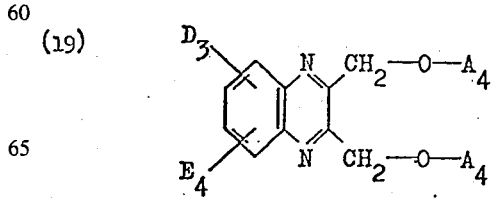

and more especially formula

(20) 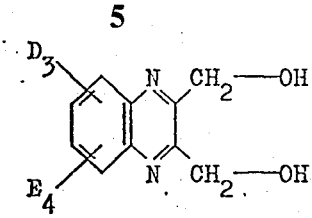

wherein $E_3$, $D_1$ and $A_4$ have the specified meaning, $E_4$ represents hydrogen or methoxy, $D_2$ hydrogen, methoxy or chlorine and $D_3$ hydrogen or methoxy.

In so far as the D and E residues together are not participating in the formation of a dioxano or dioxolo ring, they are preferably in $o$ or $p$ position in respect of each other.

If a compound of formula (1) contains a carboxyl group, this compound may occur in form of free acid, i.e. with an HOOC group or as a salt. According to the conditions of the separation, for instance the selected pH-value or the cation, which shows the salt used for precipitating, the acid group may occur as a COO cation group, such as for instance —COONa, —COOK, —COOLi, —COONH$_4$.

The lower alkyl residues mentioned in the definition of D and E are as a rule alkyl residues with 1 to 5 carbon atoms, i.e. for instance amyl, n-butyl, tertiary butyl, n-propyl, isopropyl or especially ethyl and especially methyl residues.

If $A_1$ represents an alkyl residue it is preferably a straight chained or ramified carbon chain with 1 to 20, preferably 1 to 5 carbon atoms, which can possibly be aromatic carbonic or sulphonic acids such as benzoic acid, naphthalene carbonic acids, phenyl sulphonic acid, p-toluene sulphonic acid, methoxybenzonic acids, phthalic acid, isophthalic acid or naphthalene sulphonic acids; araliphatic carbonic acids such as phenyl acetic acid, or heterocyclic carbonic acids such as pyridine carbonic acids, furan carbonic acid or thiophene carbonic acid. They may be derived also from hydroxyl groups containing 5- or 6-membered heterocyclic compounds with 1 to 3 nitrogen atoms and possibly other hetero atoms such as O, S or Se, the hydroxyl group of which reacts analogously to the hydroxyl group of an organic acid. Examples are 2,4,6-trihydroxy-1,3,5-triazine, 2,4-dihydroxy pyrimidine or 2-hydroxy thiazole. Carbonic acids as well as sulphonic acids, just as the heterocyclic hydroxy compounds, may possibly be further substituted as mentioned for the alkyl residue in $A_1$.

Alkoxy carbonyl residues in $A_1$ originate primarily form low alkyl resdue containing ester groups, such as —COOCH$_3$, —COOC$_2$H$_5$, —COO—n—C$_4$H$_9$ or —COO—tertiary—C$_4$H$_9$.

If $A_1$ represents an aryl residue, this contains preferably at most two rings such as for instance a benzene, naphthalene or diphenyl residue. These aryl residues can possibly be further substituted as specified for the alkyl group.

The 5 or 6 membered heterocyclic residues with O-, N- and S-atoms, which occur in the definition of $A_1$, may correspond for instance to the formulas

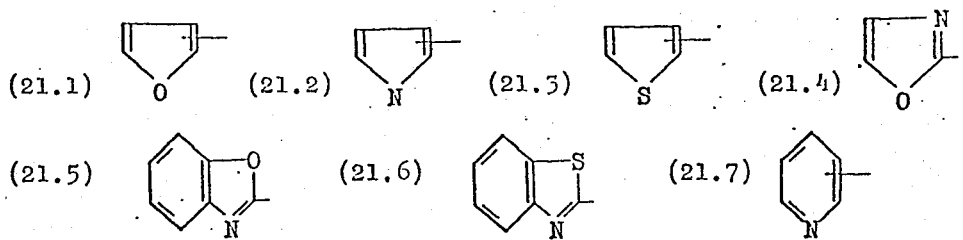

further substituted with hydroxyl, lower alkoxy, such as CH$_3$O— or C$_2$H$_5$O—, halogens such as chlorine or bromine, CN, lower carbalkoxy such as —COOCH$_3$ or —COOC$_2$H$_5$, —COOH, carbonamide such as —CONH$_2$, —CONHCH$_3$ or —CON(C$_2$H$_5$)$_2$, —SH, lower alkylmercapto such as —S—CH$_3$ or —S—C$_4$H$_9$, which may possibly be substituted in the same way as the corresponding alkyl residues. Generally these residues are bonded by means of a carbon atom to X and X'.

If $A_1$ represents an amidine residue, this corresponds for instance to the formula

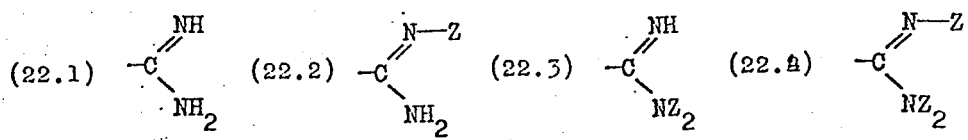

sulphone such as —SO$_2$CH$_3$ or —SO$_2$C$_6$H$_5$, hydroxyacyl such as —OCOCH$_3$ or —OCOC$_6$H$_5$, amino and substituted amino groups such as —NH$_2$, —NHCH$_3$, —N(CH$_3$)$_2$, —N(C$_2$H$_5$), —NHCOCH$_3$ or —NHCOC$_6$H$_5$, As far as both residues A and A' particularly both $A_1$ residues, form an alkylene or alkylidene residue, this contains preferably 1 to 6 carbon atoms, for instance methylene or propylene.

Acyl residues, occurring in the definitions D and $A_1$, are for instance residues derived from aliphatic carbonic acids with preferably 1 to 6 carbon atoms such as formic, acetic, propionic, valeric or capronic acid;

Z = lower alkyl. Quinoxalines with such amidine residues may occur also as a salt, for instance hydrohalogenides such as hydrobromides or hydrochlorides.

The quinoxalines of formula (1) can be used in a processing bath, preferably the colour bleaching bath and-/or in one layer of the photographic material as colour bleaching catalysts.

They can be applied either on their own or in the presence of other usual colour bleaching catalysts. It is also possible that other quinoxalines of formula (1) are used simultaneously in the colour bleaching bath. Finally quinoxalines of formula (1) may be used also in conjunction with other bleach promoting measures, such as for instance in conjunction with an irradiation, or by flushing a gas through the colour bleaching bath, or by admix organic solvents in the colour bleaching bath.

Quinoxalines of formula (1) can therefore be incorporated in a layer free from photographically bleachable dyestuff. The multi-layer material can therefore, have an additional gelatine layer containing only the catalyst, which is immediately on the emulsion carrier or between two colour layers. In the latter case the layer containing the catalyst acts also as a separating layer. Furthermore, the catalyst can also be incorporated into colloidal silver or organic yellow filter dyestuff containing filter layers, or in coating layers. As protective colloid these filter layers are recommended to contain equally as the layers with photographic dyestuff, some gelatine.

The quinoxalines of formula (1) can however also be incorporated direct into a layer containing a photographic dyestuff. Altogether the multi-layer material can have the usual composition. With the photographic materials of the specified composition it is possible to produce colour photographs in the usual known manner.

The colour bleaching catalysts of formula (1) can however, as already mentioned, be added also for instance to the colour bleaching bath where they then exert their action direct. They may also be added to a preceding treating bath, for instance the developer, a hardening bath, a stop bath or a special bath prior to the silver colour bleaching bath. Here a certain amount of the used catalyst quantity is absorbed by the photographic emulsion material and retained until it can become effective in the colour bleaching bath. Dependeing on the application, the quantity of catalyst to be applied may vary within wide limits. Generally, for a strong effect an addition of 0.001 to 0.1 g catlyst to one litre of colour bleaching bath of usual composition is sufficient, containing a silver complex former, such as for instance an alakli bromide or iodide or thiourea and possibly an oxidation protective, such as for instance sodium hypophosphite and to attain the required pH a strong organic or inorganic acid, such as for instance hexane sulphonic acid, hydrochloric acid, sulphuric acid, phosphoric acid or sodium bisulphate.

Further objects of the invention are therefore also a photographic, light sensitive material for the silver dye bleach method, containing on a carrier in at least one layer a quinoxaline of formula (1) as colour bleaching catalyst and photographing processing bath, especially colour bleaching bath characterised by containing at least one quinoxaline of formula (1) an colour bleaching catalyst.

A further object of the invention is consequently a method for producing colour photographic pictures, according to the silver dye bleach method on materials which contain, on a base, at least one silver halide emulsion layer with a photographically bleachable dye, due to exposure and development of the silver image or colour bleaching, characterised by the colour bleaching being carried out in the presence of at least one quinoxaline of formula (1) as colour bleaching catalyst.

The hitherto known colour bleaching catalysts, used in the silver dye bleach method, act on azo dyestuffs of various constitutions in differing manners. Whereas they may be highly effective in one class of azo dyestuffs, they may show with another class only a very slight bleach promoting effect. Therefore, there is a demand for compounds which on their own or combined with others effect a uniform bleaching of all three layer dyestuffs of a multi-layer material.

It has been found that quinoxalines of formula (1) are excellently suited to this purpose. They are outstanding due to the favourable position of their redox potentials and good solubility in the colour bleaching bath in the required concentrations. Especially where the residues $A—X—CH_2—$ and $A'—X'—CH_2—$ in formula (1) represent a hydroxymethyl or acetoxymethyl the quinoxalines of formula (1) used according to the invention have a good activity and effect a favourable gradation; furthermore, in their presence and with suitable application, the bleach couplings between the individual layers containing the photographic dyestuff are largely supressed. The compounds of formula (1) can also be used as original materials and intermediate products for pharmaceuticals.

Quinoxalines of formula (1) are preferably made in a known manner (compare J.C.E. Simpson, Condensed Pyridazine and Pyrazine Rings, in A. Weissberger, The Chemistry of Heterocyclic Compounds, J. Wiley & Sons, New York 1953, 203, etc.) by condensation of an aromatic 1,2-diamine with 1,2-dicarbonyl compound. Instead of the diamine it is also possible to use the corresponding essentially more stable o-nitraniline or the corresponding o-dinitro compound, which is reduced to the required diamine and then can be converted without intermediate precipitation into quinoxaline. Accordingly substituted benzfuroxanes or their reduction products (benzfurazanes) can also be reduced via intermediate stages into 1,2-diamines (F.B. Mallory & S.P. Varimbi, J. Org. Chem 28, 1656, etc. 1963) and the diamines thus made accessible to be condensed into quinoxalines. The quinoxalines occur as a better yield and higher purity, when carrying out the condensation under nitrogen.

It has been advantageous to synthesize quinoxalines of formula (1), where X and X' are different from halogen, from the corresponding 2,3-di-(bromomethyl) compounds by substitution with the required Lewis bases. As Lewis bases, for instance, the following can be used: primary and secondary amines, mercaptides, thiourea derivatives, alcoholates, anions of carbonic acid or of methylene active compounds.

As starting materials for one of the above-mentioned syntheses it is for instance possible to consider the compounds listed in the following table.

1,2-Dicarbonyl Compounds

Dibromo-diacetyl   1,4-diacetoxybutanedion-2,3
1,4-dimethoxy-butanedion-2,3,   1,4-diethoxy-butanedion-2,3   1,4-dithio-methoxy-butanedion-2,3,
1,4-dithioethoxy-butanedion-2,3.

Lewis Bases

Na-methylate, Na-ethylate, K-methylate, K-ethylate, K-propylate, K-i-propylate, K-butylate, K-i-butylate, K-t-butylate, K-amylate, K-i-amylate, Na-mercaptide, K-mercaptide, Na-methylmercaptide, K-methylmercaptide, Na-ethylmercaptide, K-ethylmercaptide, K-butylmercaptide, Na-butylmercaptide, thiourea, Na-thioacetate, Na-thiopropionate, K-thioacetate, K-thiopropionate, Na-acetate, K-acetate, Na-propionate, K-propionate, Na-butyrate, K-butyrate, Na-caproate, K-caproate, Na-benzoate, K-benzoate, Na-nicotinate, K-nicotinate;

Alkali or Earth Alkaline Salats of pyridine-2-carbonic acid, pyridine-4-carbonic acid, thiophene-2-carbonic acid, furane-2-carbonic acid, phthalic acid, i-phthalic acid, terephthalic acid, 4-methyl benzoic acid, 4-amino benzoic acid, 2-amino benzoic acid, 3-chlorobenzoic acid;

Alkali Salts of malonic acid ethyl ester, methyl malonic acid ethyl ester, ethyl malonic acid ethyl ester, butyl malonic acid ethyl ester, benzyl malonic acid ethyl ester, aceto acetic acid ethyl ester, methyl aceto acetic acid ethyl ester, 2-ethyl aceto acetic acid ethyl ester, 2-propyl aceto acetic acid ethyl ester, 2-butyl aceto acetic acid ethyl ester, 2-benzoyl aceto acetic acid ethyl ester, 4-methyl aceto acetic acid ethyl ester, 4-ethyl aceto acetic acid ethyl ester, 4-butyl aceto acetic acid ethyl ester, 4-phenyl aceto acetic acid ethyl ester, 4-(2-pyridyl)-aceto acetic acid ethyl ester, 4-(3-pyridyl)-aceto acetic acid ethyl ester, 4-(4-pyridyl)-aceto acetic acid ethyl ester, 4-(2-thienyl)-aceto acetic acid ethyl ester, 4-(2-furanyl)-aceto acetic acid ethyl ester, α-cyano acetic acid ethyl ester, malodinitrile, acetyl acetone, benzoyl acetone.

o-nitroanilines or o-dinitrobenzenes, 1,2-diamines 3,6-dimethoxy-1,2-dinitro benzene, 4-methyl-2-nitraniline, 4-methoxy-2-nitraniline, 4-ethoxy-2-nitraniline, 3-ethoxy-2-nitraniline, 2,3-dinitro anisol, 4,5-dinitro veratrol, 4-amino-3-nitrobenzoic acid, 3-amino-2-nitrobenzoic acid, 2,3-dinitraniline, 3,6-dimethoxy-2-nitraniline, 3,6-dimethoxy-o-phenylene diamine, 4-amino-5-nitro veratrol, 4,5-diaminoveratrol, 4-methyl-o-phenylene diamine, 4-methoxy-o-phenylene diamine, 4-ethoxy-o-phenylene diamine, 2-amino-3-nitronisol, 2-nitro-3-amino anisol, 3-methyl-4-amino-5-nitro anisol, 3-methyl-4,5-diamino anisol, 2,3-diamino anisol, 4-cyano-2-nitraniline, 4-cyano-o-phenylene diamine, 3-cyano-2-nitraniline, 3-cyano-o-phenylene diamine, 2,3-dinitro-4-methyl anisol, 2-amino-3-nitro-4-methyl anisol, 3-amino-2-nitro-4-methyl anisol, 2,3-diamino-4-methyl anisol, 2,3-dinitro-4-methoxy acetanilide, 2-amino-3-nitro-4-methoxy acetanilide, 3-amino-2-nitro-4-methoxy acetanilide, 2,3-diamino-4-methoxy acetanilide, 2-methoxy-4,5-dinitro acetanilide, 2-methoxy-4-amino-5-nitro acetanilide, 2-methoxy-4-nitro-5-amino acetanilide, 2-methoxy-4,5-diamino acetanilide, 2-methoxy-4,5-dinitraniline, 2-methoxy-5-nitro-p-phenylene diamine, 2-methoxy-4-nitro-m-phenylene diamine, 2-methoxy-1,4,5-triamino benzene, 2,3-dinitro-4-methoxy-N-methyl acetanilide, 2-amino-3-nitro-4-methoxy-N-methyl acetanilide, 3-amino-2-nitro-4-methoxy-N-methyl acetanilide, 2,3-diamino-4-methoxy-N-methyl acetanilide, 2,3-dinitro-4-methoxy-N-methyl aniline, 3-nitro-4-methoxy-N₁-methyl-o-phenylene diamine, 2-nitro-4-methoxy-N₁-methyl-m-phenylene diamine, 4-methoxy-N₁-methyl-1,2,3-triamino benzene.

Benzfuroxanes

4(7)-chloro-5(6)-methoxy benzfuroxane, 4(7)-chloro-5(6)-ethoxy benzfuroxane, 5(6)-chloro-4(7)-methoxy benzfuroxane, 5(6)-chloro-4(7)-ethyoxy benzfuroxane.

Benzfurazanes 4-chloro-5-methoxy benzfurazane, 4-chloro-5-ethoxy benzfurazane, 4-methoxy-5-chloro benzfurazane, 4-ethoxy-5-chloro benzfurazane.

INSTRUCTIONS FOR PRODUCTION

General Instructions

A substituted o-dinitrobenzene derivative is dissolved or suspended in a suitable medium, such as for instance acetic acid, ethyl ester, methanol, ethanol, glacial acetic acid or dimethyl formamide, mixed with 1 to 10 percent by weight of a hydrating catalyst, such as for instance a 10 percent palladium carbon catalyst and hydrated under normal pressure, possibly with initial heating. After the reaction is terminated, the catalyst is filtered off under $N_2$ and the filtrate under $N_2$ is treated with at least the aquimolecular quantity of distilled or recrystallised diketone or mixed with a solution of the diketone in a suitable solvent, whereby in most instances a colour intensification occurs and the temperature rises. Subsequently the mixture is stirred until the reaction is complete, possibly whilst heating, and the required substance isolated. The product may be purified by re-crystallisation from a suitable solvent, distillation or possibly by chromatography or sublimation.

Instead of the o-dinitrobenzene derivative, it is possible to use in some instances the corresponding o-nitraniline compound.

If the corresponding o-phenylene diamine is easily accessibly and in sufficient purity, it is direct or in form of its hydrochloride in a suitable solvent under nitrogen condensed with the diketone. When using hydrochloride it is recommended to add a suitable quantity of sodium or potassium acetate to neutralise the liberated HCl.

The Redox potentials are determined in the usual known manner by means of polarography. As solvent a mixture of dimethyl formamide-2N-sulphuric acid in a ratio of 1:1 is used in most instances. The potential is measured against an Ag/AgCl electrode of known potential and then converted to the potential against a standard hydrogen electrode. Whilst in some instances two single electron transits characterized by two polarographic waves occurring are observed, in most other instances only a polarographic wave is observed which then corresponds to the mean Redox potential.

The melting points and results of analyses of all manufactured quinoxalines of formula (100) are listed in Table I.

(100) 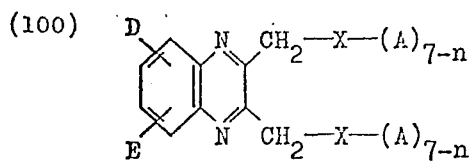

1. 2,3-Di-(bromo-methyl)-6,7-dimethoxy quinoxaline 11.4 g (50 mmol) 1,2-dimethoxy-4,5-dinitro benzene are dissolved in 250 ml acetic acid ethyl ester and after adding 1 g of 10 percent palladium hydrated to carbon at standard pressure, whereby the temperature may rise up to 50°C. $H_2$ consumption: 7000 ml (95 percent of the theory). The catalyst is filtered off and the filtration mixed under nitrogen whilst thoroughly stirring with 12.0 g (50 mmol.) solid dibromo-diacetyl. After 10 minutes at room temperature the required product commences to separate in a crystalline consistency. The reaction mixture is stirred again for an hour at room temperature and then evaporated under reduced pressure until dry. The residue is dissolved in acetone with heating, treated with charcoal and the filtrate mixed with five times the quantity of ice water. After filtering, 9.8 g (52 percent of the theory) of almost colourless crystals are obtained, the IR- and NMR-spectrum of which coincides with the postulated structure of formula (101).

2. 2,3-Di-(acetoxymethyl)-6,7-dimethoxy quinoxaline 7.6 g (20 mmol) 2,3-di-(bromo-methyl)-6,7-dimethoxy quinoxaline are dissolved in a mixture of 10 ml 7M potassium acetate solution and 185 ml ethanol, and heated to 50° to 60°C in the course of 3 hours whilst stirring. The precipitated salt is filtered off under heat, washed with 50 ml hot alcohol and the combined filtrates evaporated until dry with reduced pressure. The residue thus obtained is dissolved in 100 ml methanol in heat and treated with Norite. The filtration is mixed with 200 ml ice-water and cooled down to 0° to 5°C. The thus obtained crystalline precipitate is filtered off, washed with ice-water and dried.

Yield: 5.0 g (75 percent of the theory).

IR- and NMR-spectrum show the bands to be expected from the structure of formula (102).

3. 2,3-Di-(hydroxymethyl)-6,7-dimethoxy quinoxaline 3.4 g (10 mmol) 2,3-di-(acetoxymethyl)-6,7-dimethoxy quinoxaline are dissolved in 160 ml of an ethanol water mixture of a ratito 1:1 and after adding 2 g (14mmol) $K_2CO_3$ kept whilst stirring for 20 minutes in a bath at 110°C. The reaction mixture is cooled down to room temperature and then mixed with 800 ml ice-water. During 3 hours. stirring at 0°C a finely crystalline colourless deposit occurs, which is filtered off and washed with a little ice-water.

Yield: 2.0 g (80 percent of the theory).

IR- and NMR- spectra show the bands characteristic for the structure of formula (103).

4. 2,3-Di-(methoxymethyl) quinoxaline 9.48 g (30 mmol) 2,3-di-(bromo-methyl) quinoxaline are dissolved in 400 ml methanol and mixed with a freshly prepared $NaOCH_3$ solution in methanol — prepared from 1.38 g sodium and 50 ml methanol. The reaction mixture is heated for 3 hours whilst stirring and refluxing and subsequently reduced to approximately one-fourth of its volume under reduced pressure. The residue is poured into water and the solution thus obtained exhaustively extracted with chloroform. After drying of the organic phase over sodium sulphate and evaporation, a brown oil remains which is fractionated in high vacuum.

Yield: 2.7 g (41 percent of the theory), colourless oil of boiling point 103° to 105°C/0.08 Torr, which on leaving to stand solidifies at least partially at 5°C.

IR- and NMR-spectrum coincide with the structure of formula (104).

5. 2,3-Di-(dimethyl-aminomethyl)-6-methoxy-7-acetamino quinoxaline 15 g (38 mmol) 2,3-di-(bromomethyl)-6-methoxy-7-acetamino quinoxaline are dissolved in 250 ml ethanol. After adding 95 ml of 40 percent dimethylamine, the reaction mixture is heated under reflux for 2½ hours whilst stirring. Then 150 ml of the solvent is distilled under atmospheric pressure and the residue put into 150 ml ice-water. The aqueous solution is extracted three times with 100 ml methylene chloride each, the combined organic phases are washed twice with 100 ml saturated NaCl solution each and dried over $CaCl_2$, treated in heat with norite and finally evaporated under reduced pressure until dry. The remaining 10.3 g of the raw product (105) are dissolved for cleaning in 100 ml methylene chloride in heat, the solution treated once again with charcoal and after adding 100 ml n-hexane cooled down to 0°C. The colourless crystals which precipitate are sucked off, washed with a little ice cold hexane and dried.

Yield: 8.1 g (66 percent of the theory).

IR- and NMR-spectrum coincide with the structure of formula (105).

6. 2,3-Di-(methylthiomethyl)-6-chloroquinoxaline 6.8 g (20 mmol) 2,3-di-(bromomethyl)-6-chloroquinoxaline are suspended in 150 ml ethanol and mixed in portions with altogether 33.3 ml of an alcoholic 1.8 molar $KSCH_3$ solution and stirred for 3 hours at 50°C. After leaving to stand overnight at room temperature, the reaction mixture is treated with Norite and the filtrate poured into five times the volume of ice-water. A brown crystalline deposit is obtained, which is filtered off and dried at room temperature in vacuum.

Yield: 3.8 g (67 percent of the theory).

IR- and NMR-spectrum show the absorbtion to be expected from the structure of formula (106).

7. 2,3-Di-(2'-acetyl-2'-carbethoxy-ethyl) quinoxaline

To 60 mmol aceto acetic acid ethyl ester sodium salt in 25 ml anhydrous ethanol — made from 1.4 g sodium in 25 ml anhydrous ethanol and 7.8 g (60 mmol) aceto acetic acid ethyl ester — a suspension of 9.5 g (30 mmol) 2,3-di-(bromomethyl) quinoxaline in 250 ml anhydrous alcohol is added drop wise, whilst stirring in heat. The solution thus obtained is heated for 3 hours under reflux, whereby the $P_H$ value of the solution becomes neutral. The deposit occurring on cooling down to room temperature is separated and the filtrate cooled down to 0°C. Thereby 1.9 g (15 percent of the theory) of the required compound occur as colourless crystals.

IR- and NMR-spectrum coincide with the structure of the formula (107).

8. 2,3-Di-(Hydroxymethyl)-6-methoxy-7-amino quinoxaline 2.61 g (10 mmol) 2,3-di-(hydroxymethyl)-6-methoxy-7-acetamino quinoxaline are heated for 2½ hours in 100 ml of a 10 percent aqueous potassium hydroxide solution in reflux. After cooling down to room temperature, the solution is adjusted with 2n hydrochloric acid to a p$_H$ value of 5. The deposit thus occurring is filtered off and the filtrate extracted with acetic acid ethyl ester, the organic solution treated with active carbon and from the solution thus obtained with petrol ether 550 mg of a light brown product are precipitated. For further purificataion 400 mg of this product are chromatographed on silica gel with methylene chloride/methanol (9:1) as fluxing agent. JR- and NMR-spectrum coincide with the structure of formula (149).

9. 3'-cyano-3'-carboethoxy-2,3-cyclopentane quinoxaline 1.0 g metallic sodium is dissolved in 20 ml anhydrous ethanol. Subsequently, 4.52 g (40 mmol) cyanoacetic acid ethyl ester are added and the reaction mixture heated for 12 hours until boiling, whilst thoroughly stirring. Thereby an almost homogeneously yellow solution is obtained, to which is added in a nitrogen atmosphere a solution of 6.4 g (20 mmol) 2,3-di-(bromomethyl) quinoxaline (121) in 200 ml anhydrous ethanol. The reaction mixture is heated for 3 hours by reflux whilst stirring, whereby the colour turns to dark brown. The reaction mixture is cooled down for 5 hours to room temperature and subsequently cooled down to 0°C. The precipitated greyish deposit is filtered off, washed with cold water and dried:

Yield: 2.5 (47 percent of the theory).

JR- and NMR-spectrum coincide with the structure of formula (153).

The other compounds listed in Table I are made in analogous manner.

TABLE I

| Compound | Residues in formula (100) | | | | | Melting point in °C | Analysis | | | |
|---|---|---|---|---|---|---|---|---|---|---|
| | D | E | X | n | A | | % C cal. asc. | % H cal. asc. | % N cal. asc. | % others calculated ascertained |
| 101 | 6-OCH$_3$ | 7-OCH$_3$ | -Br | 7 | - | 185,6 | 38,33 / 38,59 | 3,22 / 3,33 | 7,45 / 7,24 | Br 42,50 / 42,27 |
| 102 | 6-OCH$_3$ | 7-OCH$_3$ | -O- | 6 | -COCH$_3$ | 121,5 | 57,48 / 57,65 | 5,43 / 5,43 | 8,38 / 8,33 | |
| 103 | 6-OCH$_3$ | 7-OCH$_3$ | -O- | 6 | -H | 183,7 (1) | 57,59 / 57,75 | 5,64 / 5,94 | 11,19 / 11,16 | |
| 104 | -H | -H | -O- | 6 | -CH$_3$ | 103-105 | 66,04 / 65,80 | 6,47 / 6,44 | 12,84 / 12,85 | |
| 105 | 6-OCH$_3$ | 7-NHOCH$_3$ | -N< | 5 | -CH$_3$ | 198-199 (2) | 61,61 / 61,67 | 7,60 / 7,64 | 21,13 / 20,96 | |
| 106 | 6-Cl | -H | -S- | 6 | -CH$_3$ | 122,8 | 50,60 / 50,87 | 4,60 / 4,76 | 9,84 / 9,64 | |
| 107 | -H | -H | -C< (5) | 4 | -H, (-COCH$_3$) (-COOC$_2$H$_5$) | 102,9 | 63,75 / 63,95 | 6,33 / 6,35 | 6,76 / 6,65 | |
| 108 | 6-OCH$_3$ | 7-NHCOCH$_3$ | -Br | 7 | - | 214-215 (2) | 38,74 / 38,55 | 3,25 / 3,27 | 10,42 / 10,26 | |
| 109 | 6,7-O-CH$_2$-O- | | -O- | 6 | -COCH$_3$ | 138,7 | 56,60 / 56,89 | 4,43 / 4,54 | 8,80 / 8,83 | |
| 110 | 6,7-O-CH$_2$-CH$_2$-O- | | -Br | 7 | - | 188-190 (2) | 38,53 / 38,85 | 2,69 / 2,99 | 7,49 / 7,53 | Br 42,73 / 42,56 |
| 111 | 6,7-O-CH$_2$-CH$_2$-O- | | -O- | 6 | -COCH$_3$ | 187,1 (2) | 57,83 / 58,05 | 4,85 / 4,95 | 8,43 / 8,28 | |
| 112 | 6,7-O-CH$_2$-O- | | -Br | 7 | - | 187,5 | 36,70 / 36,69 | 2,24 / 2,34 | 7,78 / 7,85 | Br 44,39 / 44,40 |
| 113 | 6,7-O-CH$_2$-O- | | -O- | 6 | -H | 198,5 | 56,41 / 56,68 | 4,30 / 4,49 | 11,96 / 11,77 | |
| 114 | -H | -H | -O- | 6 | -COCH$_3$ | 85,1 | 61,31 / 61,40 | 5,15 / 5,33 | 10,21 / 10,22 | |
| 115 | 6-Cl | -H | -Br | 7 | - | 143,3 | 34,27 / 34,48 | 2,01 / 2,25 | 7,99 / 8,28 | Br 45,60 / 45,20 |

TABLE 1—Continued

| Compound | Residues in formula (100) | | | | | Melting point in °C | Analysis | | | |
|---|---|---|---|---|---|---|---|---|---|---|
| | D | E | X | n | A | | % C cal. asc. | % H cal. asc. | % N cal. asc. | % others calculated ascertained |
| 116 | 5-Cl | 6-OCH₃ | -Br | 7 | - | 165,7 | 34,73 / 34,40 | 2,38 / 2,69 | 7,36 / 7,38 | |
| 117 | 5-OCH₃ | 8-OCH₃ | -Br | 7 | - | 220,1 | 38,33 / 38,33 | 3,22 / 3,19 | 7,45 / 7,32 | Br 42,50 / 42,76 |
| 118 | 5-OCH₃ | 6-Cl | -Br | 7 | - | 93,6 | 34,73 / 34,88 | 2,38 / 2,40 | 7,36 / 7,37 | |
| 119 | 5-OCH₃ | -H | -Br | 7 | - | 155,6 | 38,18 / 38,32 | 2,91 / 2,94 | 8,10 / 8,06 | Br 46,18 / 46,37 |
| 120 | 5-NHCOCH₃ | 8-OCH₃ | -Br | 7 | - | 196 (2) | 38,74 / 39,05 | 3,25 / 3,60 | 10,42 / 10,20 | Br 39,65 / 39,15 |
| 121 | -H | -H | -Br | 7 | - | 155,0 | 38,01 / 37,98 | 2,55 / 2,54 | 8,87 / 8,77 | Br 50,57 / 50,75 |
| 122 | 6-COOC₂H₅ | -H | -Br | 7 | - | 85,0 | 40,24 / 40,15 | 3,12 / 3,19 | 7,22 / 7,12 | Br 41,18 / 40,91 |
| 123 | 6-OCH₃ | -H | -Br | 7 | - | 131,4 | 38,18 / 38,10 | 2,91 / 3,05 | 8,10 / 7,91 | Br 46,19 / 45,64 |
| 124 | 6-COOC₂H₅ | -H | -O- | 6 | -COCH₃ | 94,3 | 58,96 / 58,94 | 5,24 / 5,20 | 8,09 / 8,04 | |
| 125 | 6-OCH₃ | -H | -O- | 6 | -COCH₃ | 71,8 | 59,21 / 59,46 | 5,30 / 5,55 | 9,21 / 9,03 | |
| 126 | 5-OCH₃ | -H | -O- | 6 | -COCH₃ | 80,3 | 59,21 / 59,15 | 5,30 / 5,40 | 9,21 / 9,20 | |
| 127 | -H | -H | -O- | 6 | -H | 162,6 | 63,15 / 63,20 | 5,30 / 5,50 | 14,73 / 14,75 | |
| 128 | 6-COOK | -H | -O- | 6 | -H | > 300 | 48,52 / 48,25 | 3,33 / 3,15 | 10,29 / 9,88 | |
| 129 | 6-OCH₃ | -H | -O- | 6 | -H | (6) | 59,99 / 60,28 | 5,49 / 5,76 | 12,72 / 12,80 | |
| 130 | 5-OCH₃ | 8-OCH₃ | -O- | 6 | -COCH₃ | 106,4 | 57,48 / 57,72 | 5,48 / 5,52 | 8,38 / 8,35 | |
| 131 | 6-NO₂ | -H | -Br | 7 | - | 114,5 | 33,27 / 33,25 | 1,95 / 2,05 | 11,64 / 11,67 | Br 44,27 / 44,07 |
| 132 | 6,7-O-CH₂-CH₂-O- | | -O- | 6 | -H | 180,8 | 58,06 / 58,28 | 4,87 / 5,14 | 11,29 / 11,21 | |
| 133 | 6-NO₂ | -H | -O- | 6 | -COCH₃ | 122,8 | 52,67 / 52,70 | 4,10 / 4,28 | 13,16 / 13,15 | |
| 134 | 5-Cl | 6-OCH₃ | -O- | 6 | -COCH₃ | 107,3 | 53,19 / 53,24 | 4,46 / 4,49 | 8,27 / 8,31 | Cl 10,47 / 10,68 |
| 135 | 5-OCH₃ | 6-Cl | -O- | 6 | -COCH₃ | 99,6 | 53,19 / 53,01 | 4,46 / 4,32 | 8,27 / 8,39 | Cl 10,47 / 10,79 |
| 136 | 5-Cl | 6-OCH₃ | -O- | 6 | -H | 179,3 | 51,88 / 51,93 | 4,35 / 4,47 | 11,00 / 10,79 | Cl 13,92 / 13,91 |

TABLE 1—Continued

| Compound | Residues in formula (100) | | | | | Melting point in °C | Analysis | | | |
|---|---|---|---|---|---|---|---|---|---|---|
| | D | E | X | n | A | | % C cal. asc. | % H cal. asc. | % N cal. asc. | % others calculated ascertained |
| 137 | 5-OCH$_3$ | 6-Cl | -O- | 6 | -H | 112,6 | 51,88 / 51,76 | 4,35 / 4,42 | 11,00 / 11,13 | Cl 13,92 / 14,11 |
| 138 | 6,7-O-CH$_2$-CH$_2$-O- | | -S- | 6 | -C(=NH)NH$_2$ | -(3) | 31,95 / 31,69 | 3,45 / 3,82 | 15,97 / 16,04 | Br 30,37 / 29,73; S 12,19 / 11,75 |
| 139 | -H | -H | -S | 6 | -C(=NH)NH$_2$ | -(3) | 30,78 / 30,60 | 3,44 / 3,44 | 17,95 / 18,17 | Br 34,13 / 34,23 |
| 140 | -H | -H | -S- | 6 | -C$_4$H$_9$ | 55,8 | 64,62 / 64,81 | 7,83 / 8,04 | 8,37 / 8,40 | S 19,17 / 19,22 |
| 141 | -H | -H | -S- | 6 | -C(CH$_3$)$_2$ (4) | 195,5 | 59,51 / 59,26 | 5,38 / 5,24 | 10,68 / 10,44 | S 24,44 / 23,61 |
| 142 | -H | -H | -S- | 6 | -COCH$_3$ | 105,9 | 54,88 / 54,96 | 4,61 / 4,61 | 9,14 / 9,13 | S 20,93 / 21,02 |
| 143 | H | H | Cl | 7 | — | 148,8 | 52,89 / 53,09 | 3,55 / 3,89 | 12,34 / 12,09 | Cl 31,22 / 30,93 |
| 144 | 5-CH$_3$- | H | Cl | 7 | — | 110,3 | 54,79 / 54,91 | 4,18 / 4,30 | 11,62 / 11,63 | Cl 29,41 / 29,40 |
| 145 | 5-OCH$_3$ | 8-OCH$_3$ | Cl | 7 | — | 200,1 | 50,19 / 50,27 | 4,21 / 4,51 | 9,76 / 9,48 | Cl 24,69 / 24,52 |
| 146 | 6-C$_4$H$_9$ | H | Br | 7 | — | -(6) | 40,31(7) / 40,13 | 5,07(7) / 4,94 | 6,72(7) / 6,46 | Br 38,31(7) / 38,48 |
| 147 | 6-C$_4$H$_9$ | H | O | 6 | -COCH$_3$ | -(6) | 65,44 / 65,28 | 6,71 / 6,76 | 8,48 / 8,30 | — |
| 148 | 6-C$_4$H$_9$ | H | O | 6 | -H | -(6) | 68,27 / 68,19 | 7,37 / 7,20 | 11,37 / 11,23 | — |
| 149 | 6-NH$_2$ | 7-OCH$_3$ | O | 6 | H | 158 (2) | 56,16 / 56,24 | 5,57 / 5,62 | 17,86 / 17,58 | — |
| 150 | 6-OH | H | Cl | 7 | — | 172 bis 174 (2) | 49,24 / 49,18 | 3,31 / 3,38 | 11,49 / 11,21 | Cl 29,07 / 28,86 |
| 151 | 6-OCH$_3$ | 7-NH-COCH$_3$ | O | 6 | H | 236,3 | 56,31 / 56,57 | 5,45 / 5,33 | 15,15 / 15,27 | |
| 152 | 6-OCH$_3$ | 7-NHCOCH$_3$ | O | 6 | -COCH$_3$ | 158,0 | 56,51 / 56,81 | 5,30 / 5,56 | 11,63 / 11,85 | |
| 153 | H | H | C | H | -C(CN)(COOC$_2$H$_5$) (4) | 146,3 | 67,40 / 67,12 | 4,90 / 4,98 | 15,72 / 15,50 | |

Explanation of Table I
1. Boiling point at 0.08 mm Hg.
2. Decomposition
3. Occurs as hydrobromide
4. The two A form together this residue
5.

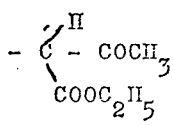

6. Oil, which partially solidifies when left standing.
7. With 2.5 Mol crystal water.

EXAMPLE 1

A solution consisting of 3.3 ml 6 percent gelatine, 2.0 ml of a 1 percent solution of hardener, 2,4-dichloro-6-phenylamino-1,3,5-triazine-3'-sulphonic acid, 0.5 ml of a $2.10^{116\ 3}$ molar solution of the compound of formula (101) in dimethyl formamide and 4.2 ml of water is poured on to a glass plate of 13 cm × 18 cm. After drying there is poured over it a solution consisting of 3.3 ml of 6 percent gelatine, 3.3 ml of a silver bromide emulsion, containing 5.3 g of silver per 100 g of emulsion, 2.0 ml of the above hardener, 0.3 ml of a 1 percent solution of the bluish-green dyestuff of formula

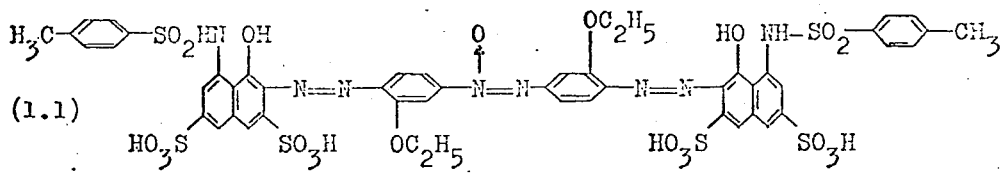

(1.1)

and 1.1 ml water. After drying of the layer thus obtained, a step wedge is copied on to it. Subsequently, the copy is developed according to the following specifications:
1. 6 minutes developing in a bath, containing per litre 50 g anhydrous sodium sulphite, 0.2 g 1-phenyl-3-pyrazolidone, 6 g hydroquinone, 35 g anhydrous sodium carbonate, 4 g potassium bromide and 0.3 g benztriazole.
2. Fixing for 2 minutes with a solution of 200 g sodium thiosulphate, 10 g anhydrous sodium sulphite, 20 g sodium acetate and 10 ml glacial acetic acid per litre of water.
3. Rinsing for 4 minutes.
4. 6 minutes colour bleaching with a solution of 10 g potassium iodide in 1 litre of 1 N sulphuric acid.
5. 2 minutes rinsing.
6. Bleaching for 2 minutes of the residual silver with a bath containing 150 ml 37 percent hydrochloric acid, 25 g copper sulphate and 30 g potassium bromide per litre.
7. Rinsing for 2 minutes.
8. Fixing for 4 minutes as described under (2).
9. Rinsing for 10 minutes.

After drying the clean picture bleached colourless is obtained with a marked graduated gradation of the wedge used as original.

EXAMPLE 2

When using instead of the compound of formula (101) the compound of formula (108) and proceeding as described in Example 1, once again a clean positive image of the exposed wedge is obtained. If using instead of the compound of formula (101) the compound of formula (124) and proceeding as in Example 1, also a clean positive image of the wedge used as original is obtained.

EXAMPLE 3

A photographic material with three colour layers contains on a white opaque cellulose acetate film a red-sensitive silver bromide emulsion with the bluish-green dyestuff of formula

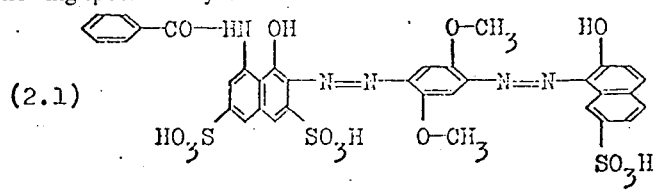

(2.1)

above it an empty gelatine separating layer, then a green-sensitive silver bromide emulsion with the purple dyestuff of formula (2.2) 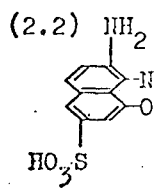 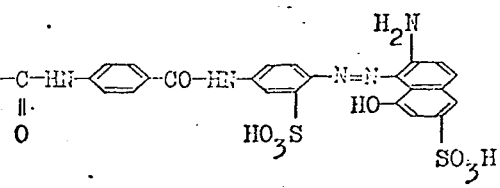

After a further separating layer there follows a layer with a yellow filter dyestuff or with colloidal silver acting as yellow filter. Above it there is a silver bromide layer with the yellow dyestuff of formula (2.3) 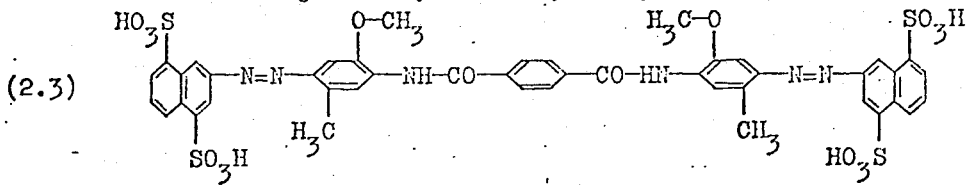

and a covering layer. All layers are hardened with a halogen triazine compound, such as 2,4-dichloro-6-phenylamino1 1,3,5-triazine-3'-sulphonic acid.

This copying material is exposed below a stepped wedge one after the other in the three spectral ranges, blue (Wratten filter Kodak 2 B + 49); green (Wratten filter Kodak 16 + 61) and red (Wratten filter Kodak 2 × 29) and developed and fixed for 7 minutes as described in Example 1. Subseqently bleaching is carried out in a silver colour bleaching bath, which contains per litre 27 ml of 96 percent sulphuric acid, 10 g potassium iodide and 10 ml of a $4.10^{116}$ $^2$ molar solution of the compound of formula (103) in ethanol. After a short rinsing the residual silver is oxidised as described in Example 1 under 6), rinsed and fixed as described above. After thorough washing there is obtained after drying a bleached neutral wedge on white ground, which is parallel to the gradation of the original.

EXAMPLE 4

Instead of the compound of formula (103) as in Example 3, the compound of formula (111) or another of the quinoxalines listed in Table I can be used in a suitable photographically inactive solvent miscible with water. If proceeding then similarly as in Example 3, one obtains with suitable adaptation again the positive grey image of the used original, which is clean and in the corresponding places bleached white.

EXAMPLE 5

A photographic material as described in Example 3 is exposed in the three spectral ranges as specified. Subsequently the copy is developed as follows:
1. Develop for 7 minutes in a bath, containing per litre 50 g anhydrous sodium sulphite, 0.2 g 1-phenyl-3-pyrazolidone, 6 g hydroquinone, 35 g anhydrous sodium carbonate, 4 g potassium bromide, 0.3 g benztriazole and 20 ml of a $4.10^{116}$ $^2$ molar solution of the compound of formula (128) in water.
2. Fix for 2 minutes with a solution of 200 g sodium thiosulphate, 10 g anhydrous sodium sulphite and 10 ml of glacial acetic acid per litre.
3. Rinse for 2 minutes.
4. Colour bleach for 10 minutes with a solution of 10 g potassium iodide in 1 litre of sulphuric acid.
5. Rinse for 2 minutes.
6. Bleach for 8 minutes the residual silver with a bath containing 150 ml of a 37 percent hydrochloric acid, 25 g copper sulphate and 30 g potassium bromide per litre.
7. Rinse for 2 minutes.
8. Fix for 3 minutes, as described under (2).
9. Rinse for 10 minutes.

After drying a neutral wedge is obtained with a cleanly white and clearly graduated gradation.

EXAMPLE 6

A glass plate of size 13 cm × 18 cm is coated with a solution of the following composition: 3.3 ml of 6 percent gelatine, 3.3 ml of a silver bromide emulsion, which contains 5.3 g of silver for each 100 g of emulsion, 1.0 ml of a 1 percent solution of the hardener described in Example 1, 0.3 ml of a 1 percent solution of the bluish-green dyestuff of formula (1.1) and 2.1 ml of water.

After drying a stepped wedge is copied on to the layer thus obtained and the plate then treated as follows:
1. Develop for 10 minutes in a bath, which contains per litre 20 g anhydrous sodium sulphite, 1 g 4-methylamino phenol sulphate, 4 g hydro-quinone, 10 g anhydrous sodium carbonate, 2 g potassium bromide and 3 g sodium rhodanide.
2. Rinse for 2 minutes.
3. Oxidise for 2 minutes with a solution of 5 g of potassium bichromate and 5 ml of a 96 percent sulphuric acid per litre of solution.
4. Rinse for 4 minutes.
5. Wash for 5 minutes with a solution of 50 g anhydrous sodium sulphite per litre.
6. Rinse for 3 minutes.
7. Develop for 4 minutes with a solution consisting of 2 g calgon, 50 g anhydrous sodium sulphite, 10 g hydroquinone, 50 g anhydrous sodium carbonate, 2 g 1-phenyl-3-pyrazolidone and 20 ml of a 1 percent solution of t-butyl-aminoborane per litre.
8. Rinse for 2 minutes.
9. Colour bleach for 6 minutes with a colour bleaching bath, containing per litre 27 ml of 96 percent sulphuric acid, 10 g potassium iodide and 10 ml of a $4.10^{116}$ $^2$- molar solution of the compound of formula (130).
10. Rinse for 2 minutes.
11. Bleach for 2 minutes the residual silver as described in Example 1 under (6).
12. Rinse for 2 minutes.
13. Fix for 4 minutes, as described in Example 1 under (2).
14. Rinse for 10 minutes.

After drying, a clean colourless bleached picture of the used wedge with an opposite gradation is obtained.

Instead of the compound of formula (130) it is possible to use the compound of formula (135) or another of the quinoxalines listed in Table I in a suitable photographically inactive solvent miscible with water. If then proceeding as described in this example, a clean colourless bleached picture of the exposed wedge with opposite gradation is again obtained.

EXAMPLE 7

A solution consisting of 3.3 ml of a 6 percent gelatine, 3.3 ml of a silver bromide emulsion, containing 5.3 g silver per 100g of emulsion, 1.0 ml of a 1 percent solution of the hardener described in Example 1, 0.3 ml of a 1 percent solution of the bluish-green dyestuff of formula (1.1) described in Example 1, 0.5 ml of a $4.10^{116}$ $^2$ molar solution of the compound of formula (101) in dimethyl formamide and 1.6 ml water is cast on to a glass plate of size 13 × 18 cm. After drying, a stepped wedge is copied on to the layer thus obtained and the copy processed as described in Example 1.

After drying a clean and bleached colourless positive picture of the wedge used as original is obtained.

The compound of formula (101) can be replaced by the compound of formula (102) dissolved in dimethyl formamide. If then proceeding as described in this example, once again a clean, colourless, bleached, positive image of the used original is obtained.

With equally good success it is possible to use instead of the compound of formula (101) the quinoxaline of formula (134) as acetonic solution.

EXAMPLE 8

A photographic material, as described in Example 3, is exposed in the three spectral ranges. The copy is then processed as follows:

1. Develop for 7 minutes in a bath, which contains per litre 20 g anhydrous sodium sulphite, 10 g anhydrous sodium carbonate, 4 g hydro-quinone, 1 g 4-methyl-amino-phenol sulphate, 2 g potassium bromide and 10 ml of a $4.10^{-2}$ molar solution of the compound of the formula (128) in water.
2. Fix for 2 minutes with a solution of 200 g sodium thiosulphate, 15 g anhydrous sodium sulphite, 25 g crystallised sodium acetate and 13 ml glacial acetic acid per litre.
3. Rinse for 2 minutes.
4. Colour bleach for 10 minutes in a bath containing 10 g potassium iodide, 27 ml of a 96 percent sulphuric acid and 5 ml of a $4.10^{-2}$ molar solution of the compound of formula (128) in water per litre.
5. Rinse for 2 minutes.
6. Bleach for 8 minutes the residual silver as described in Example 5 under (6).
7. Rinse for 2 minutes.
8. Fix for 5 minutes as described under (2).
9. Rinse for 10 minutes.

After drying a clean, positive image bleached white of the used original is obtained.

EXAMPLE 9

A glass plate of size 13 cm × 18 cm is coated with a solution consisting of 3.3 ml of a 6 percent gelatine, 2.0 ml of a 1 percent solution of the hardener described in Example 1, 3.3 ml of a silver bromide emulsion, containing per 100 g of emulsion 5.3 g of silver, 0.3 ml of a 1 percent solution of the bluish-green dyestuff of formula (1.1) and 1.1 ml of water. After drying a stepped wedge is copied on to it (50 Lux, 3 seconds) and the copy processed as follows:

Colour bleach for 6 minutes with a solution containing per litre 27 ml of a 96 percent sulphuric acid, 10 g potassium iodide and 10 ml each of a $4.10^{-2}$ molar solution of one of the compounds of formulae (113), (114), (126) or (136) in ethanol or another suitable photographically inactive solvent, miscible with water.

After two minutes of rinsing the residual silver is oxidised, as described in Example 1 under 6), rinsed and fixed as described above. The copy is thoroughly washed and dried. In all instances a clean, colourless bleached, bluish-green wedge the gradation of which is parallel to that of the original is obtained.

EXAMPLE 10

A solution consisting of 3.3 ml of gelatine, 1.0 ml of a 1 percent solution of purple dyestuff of formula (10.1) 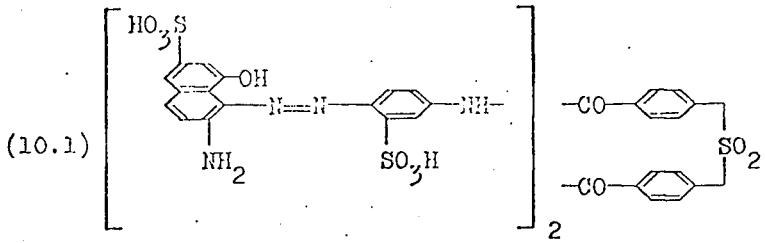

2.0 ml of a 1 percent solution of the hardener described in Example 1, 3.3 ml of a silver bromide emulsion, containing 5.3 g of silver per 100 g of emulsion and 0.4 ml of water, is cast on to a glass plate of size 13 cm × 18 cm. After drying a stepped wedge (50 Lux, 5 seconds) is copied on it and the copy processed as follows:

Develop and fix as described in Example 1. Colour bleach for 6 minutes with a solution containing per litre 10 g potassium iodide, 27 ml of a 96 percent sulphuric acid and 10 ml each of a $4.10^{-2}$ molar solution of the compound of formulae (110 or (129) in ethanol or another suitable photo raphically inactive solvent miscible with water. After brief rinsing the residual silver is oxidised as described above, rinsed and fixed. After thorough washing and drying there is thus obtained in all instances a colourless bleached image, which is clean and a clearly graduated gradation of the original used.

EXAMPLE 11

On to a glass plate of size 13 cm × 18 cm is cast a solution consisting of 3.3 ml of a 6 percent gelatine, 2.0 ml of a 1 percent solution of the hardener described in Example 1, 3.3 ml of a silver bromide emulsion containing 5.3 g of silver per 100 g of emulsion, 0.5 ml of the yellow dyestuff of formula (11.1) 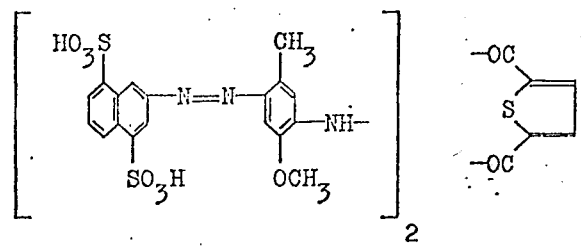

and 0.9 ml water. After drying a stepped wedge is copied on to it (50 Lux, 5 seconds) and processed analogously to Examples 9 and 10, whereby the colour bleaching bath contains instead of the compounds mentioned therein, 10 ml of a $4.10^{-2}$ molar solution of one of the compounds of formulae (109), (139), (141) or (133) in water or another suitable photographically inactive organic solvent miscible with water. After drying is then obtained a clean, colourless bleached yellow image of the used original.

EXAMPLE 12

On to a photographic material, as described in Example 10, a stepped wedge is exposed (500 Lux, 10 seconds). The strip is thoroughly dampened with a 1 N sulphuric acid, containing per litre $10^{-2}$ mol of the compound (130), and subsequently brought into close contact with a bright iron sheet. After short rinsing, fixing is carried out and subsequently thorough rinsed. After drying, a silver wedge corresponding to the original is obtaned with a colour wedge in the opposite direction. If proceeding as described above and oxidising the formed silver as in Example 5 point (6), rinsing, fixing and once again rinsing, a purple wedge with a gradation in the opposite direction is obtained.

We claim:

1. A quinoxaline of the formula

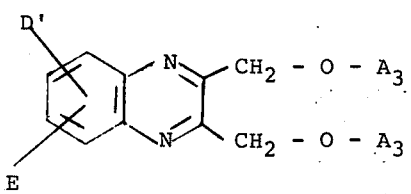

wherein D' represents chlorine, methoxy, amino, nitro, lower alkyl, carboethoxy or carboxy, E represents hydrogen or lower alkoxy, or wherein D' and E in vicinal positions, together represent —O—(CH$_2$)$_m$—O—, wherein $m$ is 1 or 2, and A$_3$ represents hydrogen or acetyl.

2. A quinoxaline according to claim 1 of the formula

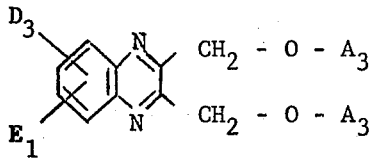

wherein A$_3$ is hydrogen or acetyl, D$_3$ is chlorine, methoxy, acetylamino, carboethoxy or carboxy, E$_1$ is hydrogen or methoxy, or D$_3$ and E$_1$, being in vicinal positions, together represent —O—(CH$_2$)$_m$—O— wherein $m$ is 1 or 2.

3. A quinoxalane according to claim 1 of the formula

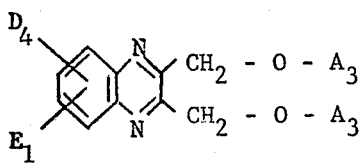

wherein A$_3$ is hydrogen or acetyl, D$_4$ is chlorine, methoxy, carboethoxy or carboxy, E$_1$ is hydrogen or methoxy, or D$_4$ and E$_1$, being in vicinal positions, form together a radical of the formula —O—(CH$_2$)$_m$—O— wherein $m$ is 1 or 2.

4. A quinoxaline according to claim 1 of the formula

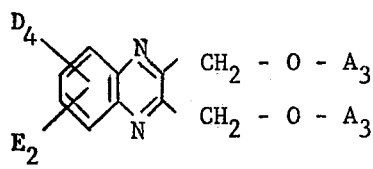

wherein A$_3$ is hydrogen or acetyl, D$_4$ is chlorine, methoxy, carboethoxy or carboxy, E$_2$ is hydrogen, or D$_4$ and E$_2$, being in vicinal positions, together represent —O—(CH$_2$)$_m$—O— wherein $m$ is 1 or 2.

5. A quinoxaline according to claim 1 of the formula

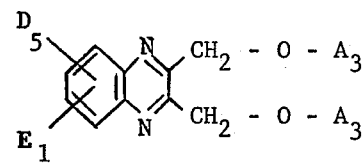

wherein A$_3$ is hydrogen or acetyl, D$_5$ is chlorine or methoxy, E$_1$ is hydrogen or methoxy, or D$_5$ and E$_1$, being in vicinal positions, together represent —O—(CH$_2$)$_m$—O— wherein $m$ is 1 or 2.

6. A quinoxilane according to claim 1 of the formula

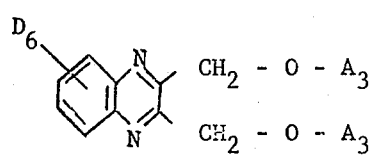

wherein A$_3$ is hydrogen or acetyl and D$_6$ is chlorine or methoxy.

7. A quinoxaline according to claim 1 of the formula

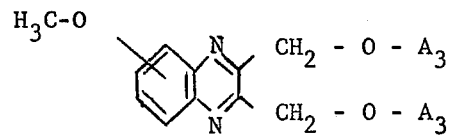

wherein A$_3$ is hydrogen or acetyl.

* * * * *